_United States Patent_ [19]

Colvert

[11] Patent Number: 4,874,583
[45] Date of Patent: Oct. 17, 1989

[54] BUBBLE CAP ASSEMBLY IN AN EBULLATED BED REACTOR

[75] Inventor: James H. Colvert, Houston, Tex.
[73] Assignee: Texaco Inc., White Plains, N.Y.
[21] Appl. No.: 125,834
[22] Filed: Nov. 27, 1987
[51] Int. Cl.⁴ .............................................. B01J 8/18
[52] U.S. Cl. ............................... 422/143; 137/533.11; 261/114.2; 261/114.4; 422/140
[58] Field of Search ............... 422/140, 143; 34/57 A; 261/114.2, 114.4; 137/533.11, 533.13, 533.15

[56] References Cited

U.S. PATENT DOCUMENTS

| | | |
|---|---|---|
| Re. 25,770 | 4/1965 | Johanson . |
| 2,488,249 | 11/1949 | White .................................. 261/114.2 |
| 3,197,286 | 7/1965 | Farkas et al. ......................... 422/140 |
| 3,197,288 | 7/1965 | Johanson ............................. 422/140 |
| 3,298,793 | 1/1967 | Mallison et al. ..................... 422/143 |
| 3,475,134 | 10/1969 | Weber et al. ........................ 422/140 |
| 3,921,663 | 11/1975 | Beranek et al. ..................... 261/114.4 |
| 4,062,656 | 12/1977 | Blaser et al. ..................... 422/143 X |
| 4,707,340 | 11/1987 | Milligan ........................... 422/143 X |
| 4,715,996 | 12/1987 | Lambousy et al. ............. 422/143 X |

_Primary Examiner_—Michael S. Marcus
_Assistant Examiner_—Amalia L. Santiago
_Attorney, Agent, or Firm_—Jack H. Park; Kenneth R. Priem; Richard A. Morgan

[57] ABSTRACT

A bubble cap assembly and distributor plate is revealed uniquely suited for a reactor in an ebullated bed process. In the riser of the bubble cap assembly a ball check valve is mounted on a valve seat. An orifice mixer below the valve seat delivers a homogeneous vapor-liquid mixture to the orifice in the valve seat thereby minimizing slug flow which causes destructive valve chatter. The fluid outlet port is positioned in the riser to hydraulically limit ball travel between the valve seat and the cap, eliminating the need for pins or other restraints.

3 Claims, 2 Drawing Sheets

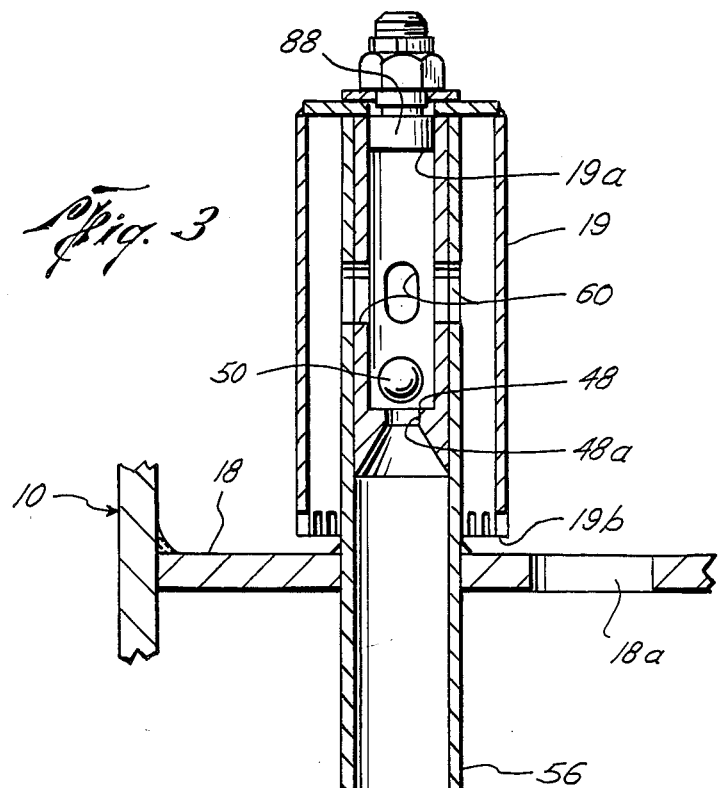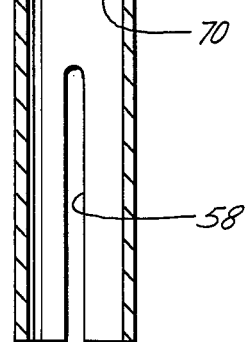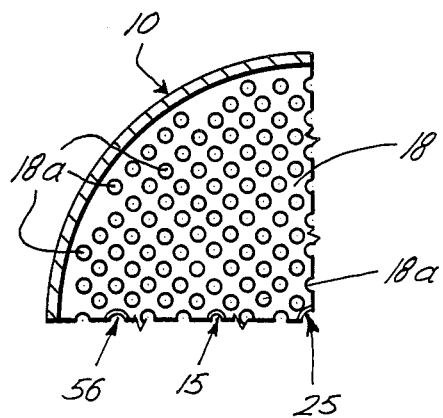

BUBBLE CAP ASSEMBLY IN AN EBULLATED BED REACTOR

BACKGROUND OF THE INVENTION

1. Field of the Invention

The invention relates to an improved bubble cap assembly in an ebullated bed process. Specifically, the invention is the combination of a bubble cap assembly with an improved fluid outlet port position to prevent check ball on cap wear. The invention is also a combination of the bubble cap assembly with an orifice mixer to homogenize the gas and liquid phases flowing through the bubble cap assembly. The combination promotes steady flow of fluid causing reduced wear of bubble caps such as those described in U.S. Pat. No. 3,475,134.

2. Description of Relevant Methods in the Field

The ebullated bed process comprises the passing of concurrently flowing streams of liquids or slurries of liquids and solids and gas through a vertically cylindrical vessel containing catalyst. The catalyst is placed in random motion in the liquid and has a gross volume dispersed through the liquid medium greater than the volumne of the mass when stationary. This technology has found commercial application in the upgrading of heavy liquid hydrocarbons or converting coal to synthetic oils.

The process is generally described in U.S. Pat. No. Re. 25,770 to Johanson incorporated herein by reference. A mixture of hydrocarbon liquid and hydrogen is passed upwardly through a bed of catalyst particles at a rate such that the particles are forced into random motion as the liquid and gas pass upwardly through the bed. The catalyst bed motion is controlled by a recycle liquid flow so that at steady state, the bulk of the catalyst does not rise above a definable level in the reactor. Vapors along with the liquid which is being hydrogenated pass through that upper level of catalyst particles into a substantially catalyst free zone and are removed at the upper portion of the reactor.

In an ebullated bed process the substantial amounts of hydrogen gas and light hydrocarbon vapors present rise through the reaction zone into the catalyst free zone. Liquid is both recycled to the bottom of the reactor below a distributor plate and removed from the reactor as product from this catalyst free zone. Vapor is separated from the liquid recycle stream before being passed through the recycle conduit to the recycle pump suction. The recycle pump (ebullating pump) maintains the expansion (ebullation) and random motion of catalyst particles at a constant and stable level.

Reactors employed in a catalytic hydrogenation process with an ebullated bed of catalyst particles are designed with a transverse distributor plate which distributes the feed hydrocarbon liquid and hydrogen uniformly to three phase expanded bed of catalyst in order to maintain a stable, random motion within the bed. The transverse distributor plate also serves as a partition to separate hydrocarbon liquid and hydrogen feed streams from the expanded catalyst bed and provides physical support for the elevated catalyst bed within the reactor.

U.S. Pat. No. 3,475,134 issued Oct. 28, 1969, to C. L. Weber and R. H. Wolk incorporated herein by reference describes a transverse distributor plate comprising a bubble cap and plate assembly. The bubble cap comprises a ball check valve mounted on a valve seat, the valve seat comprising an orifice. The ball seals the orifice to back flow of solid catalyst while permitting drainage of liquid off the distributor plate during shut down. At flow conditions, the ball is lifted off the seat. The valve seat orifice is sized to accelerate the up flowing fluids through the valve to assure up flow of solids and to prevent down flow through the valve during transient or disrupted flow.

BRIEF DESCRIPTION OF THE DRAWINGS

FIG. 2 is a partial plan view of the transversely extending partition taken along line 2—2 of FIG. 1.

FIG. 3 is a vertical section through a bubble cap assembly.

DETAILED DESCRIPTION OF THE DRAWINGS

Figure 1:
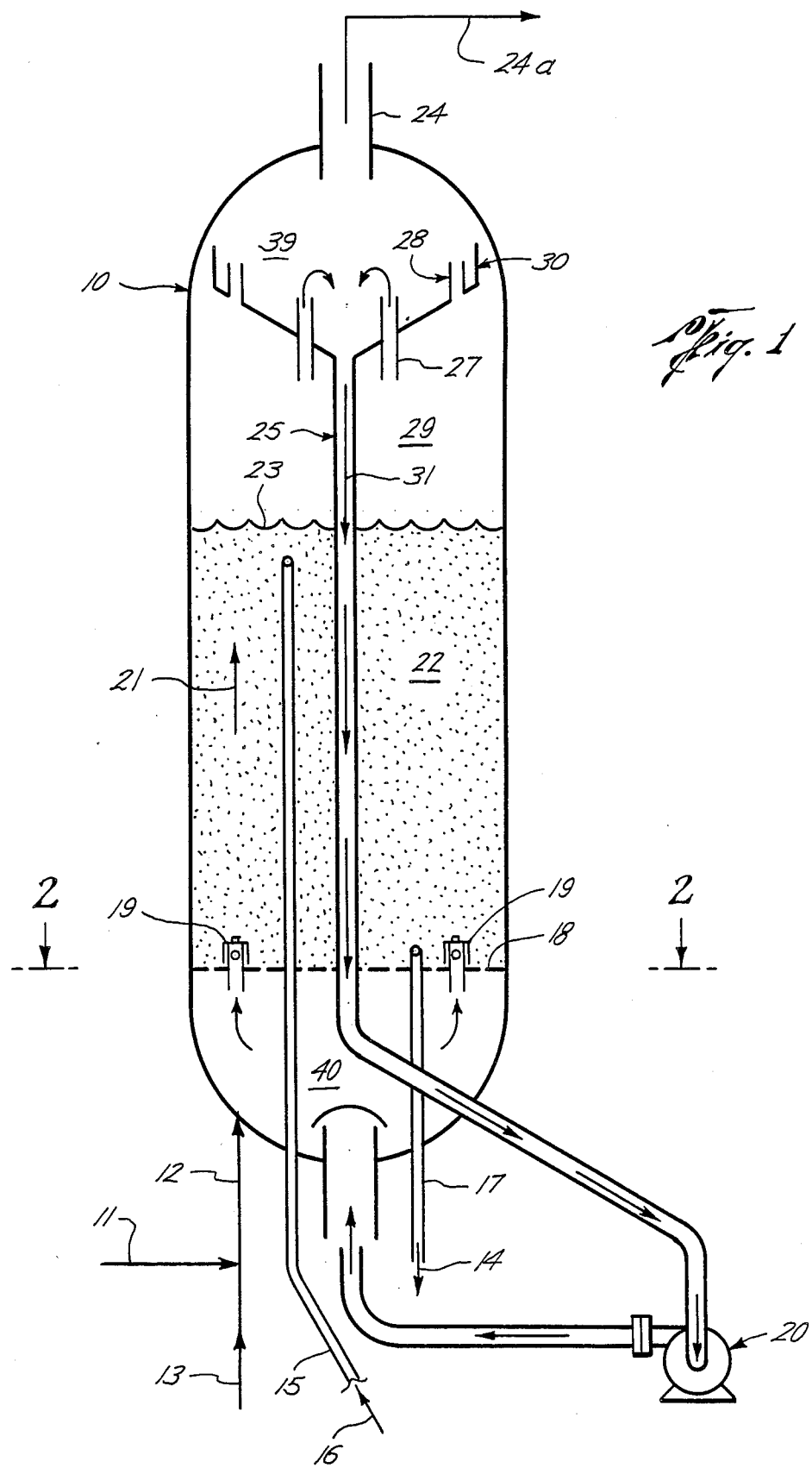
FIG. 1 is a sectional elevated view of a reaction vessel containing a transversely extending partition.

In order to demonstrate and provide a better understanding of the invention, reference is made to FIG. 1. Reaction vessel 10 is positioned with its long axis in a vertical position and is generally of a circular cross section. Although this FIG. 1 drawing is schematic in order to show its various features, it will be understood that the reactor is constructed in such a fashion and from such materials that it is suitable for reacting liquids, liquid-solid slurries, solids and gases at elevated temperatures and pressures and in a preferred embodiment for treating hydrocarbon liquids with hydrogen at high pressures and high temperatures, e.g. 100 to 5000 psi and 300° to 1500° F. The reactor 10 is fitted with a suitable inlet conduit 12 for feeding heavy oil and a hydrogen-containing gas. Outlet conduits are located in the upper portion of reactor 10, outlet conduit 24 designed to withdraw vapor and liquid. The reactor also contains means for introducing and withdrawing catalyst particles, which are shown schematically as entry conduit 15 through which fresh catalyst 16 is flowed and exit conduit 17 through which spent catalyst 14 is withdrawn.

Heavy oil feedstock is introduced through line 11, while hydrogen-containing gas is introduced through line 13, and may be combined with the feedstock and fed into reactor 10 through line 12 in the bottom of the reactor. The incoming fluid passes through transverse distributor plate 18 containing bubble caps 19 which uniformly distribute the fluid coming from line 12 over the entire cross-sectional area of reactor 10. This transverse distributor plate 18 is uniformly perforated with perforations 18a across the horizontal cross-section as shown in FIG. 2. This permits the uniform flow of fluids from a lower chamber 40, which may be a plenum chamber, into bed 22. This transverse distributor plate 18 is typical of a bubble cap tray and is suitably fastened to the wall of reactor 10 by brackets, channels, welds or any combination thereof.

The mixture of liquid and gas flows upwardly, and the catalyst particles are thereby forced into an ebullated movement by the gas flow and the liquid flow delivered by recycle pump 20 which may be either internal or external to the reactor 10. The upward liquid flow delivered by this recycle pump is sufficient to cause the mass of catalyst particles in bed 22 to expand by at least 10% and usually by 20 to 200%, thus permitting gas and liquid flow as shown by direction arrow 21 through reactor 10. Due to the upwardly directed flow provided by the pump and the downward forces provided by gravity, the catalyst bed particles reach an upward level of travel or ebullation while the lighter liquid and gas continue to move upward beyond that level. In this drawing, the upper level of catalyst or catalyst-liquid interface is shown as 23, and the catalytic reaction zone extends from transverse distributor plate 18 to level 23. Catalyst particles in bed 22 in this reaction zone move randomly and are uniformly distributed through this entire zone in reactor 10.

At steady state, few catalyst particles rise above catalyst-liquid interface 23. The volume above the interface 23 is filled with liquid and entrained gas or vapor. Gas and vapor are separated from liquid in the recycle cup 30 to collect and recycle a liquid with a substantially reduced gas and vapor content through downcomer 25. Gases, vapors, and liquid product are withdrawn together through conduit 24.

The upper portion of downcomer 25 is the recycle cup 30, in this drawing a tubular cup comprising tubes or conduits. A plurality of vertically directed conduits 27 and 28 provides fluid communication between the reaction zone and recycle cup 30. Gas-entrained fluid moves upwardly through the conduits 27 and 28, and upon leaving the upper ends of these conduits, part of the fluid reverses direction and flows downward to and through recycle conduit 25 in the direction of arrow 31 to the inlet of recycle pump 20 and thereby is recycled through the lower portion of reactor 10 below transverse distributor plate 18. Gases and vapors which are separated from the liquid, rise to collect in the upper portion of reactor 10 and are removed through outlet conduit 24. The gases and vapors removed at this point are treated using conventional means to recover as much hydrogen as possible for recycle into the gas feed inlet line 13.

Reference is made to FIG. 3, a vertical section through a bubble cap assembly. Within the perforations 18a through the partition 18 are positioned risers 56. The riser 56 comprises a fluid outlet port 60 providing via riser 56 and valve seat orifice 48a, fluid communication between lower chamber 40 and catalyst bed 22. The bubble caps 19 are fastened to the riser 56 by fastening means such as welds, washers, bolts and nuts or combination thereof in such a fashion such that the lower edge 19b of bubble cap 19 is located above the distributor plate 18.

Within the riser assembly is positioned a check valve comprising a ball 50 located above a seat 48. The diameter of the orifice in seat 48 is less than the diameter of ball 50. The ball 50 is unobstructed to move within riser 56 vertically from seat 48 to a substantially horizontal ball contact surface 19a which may be a surface of bubble cup 19 or a surface of member 88, a member of the fastening means which secures the bubble cap to the riser. Fluid dynamics dictates that the ball not travel above the port 60. For this reason, port 60 is located within riser 56 and at least one ball diameter from both seat 48 and contact surface 19a, so that the ball 50 does not beat against seat 48 or contact surface 19a.

Riser 56 comprises preferably a slot 58 positioned to allow for the passage of gas under partition 18 into the riser 56. Vertically, above slot 58 and within riser 56 is positioned an orifice mixer 70 or a series of orifice mixers for the homogeneous mixing of liquid and vapor. The homogeneous mixing minimizes flow of alternating slugs of liquid and gas through seat 48 to ball 50. Applicant has discovered this slug flow contributes to seat wear, caused by the ball 50 repeatedly beating against the seat 48. Homogeneous liquid-vapor flow reduces the vertical movement of ball 50. Positioning port 60 one or more ball diameters above seat 48 also reduces seat wear due to ball chatter. Additionally, positioning port 60 one or more ball 50 diameters below contact surface 19a eliminates internal wear.

SUMMARY OF THE INVENTION

The invention is a bubble cap assembly in combination with a high pressure reaction vessel adapted for reacting fluid hydrocarbon feedstocks with a hydrogen-containing gas at elevated temperatures and pressures in the presence of a bed of particulate solid catalyst the process referred to in the art as an ebullated bed process. In the ebullated bed process, hydrogen containing gas and feedstock are introduced into the lower end of a generally vertical catalyst containing vessel, These fluids are introduced at sufficient velocity to force the catalyst into random motion and to expand the volume of the catalyst bed to greater than the static volume. The mixture of feedstock, gas and catalyst constitutes a turbulent zone wherein minimum solids settling takes place. The lower portion of the turbulent zone is defined by a transversely extending partition having a plurality of uniformly positioned perforations extending through the partition.

Mounted in each perforation is a bubble cap assembly, The bubble cap assembly includes a riser and a cap surmounting the riser, the riser having ports communicating fluid flow through the bubble cap assembly to the turbulent zone. The bubble cap assembly has a ball check valve in the riser to prevent downflow of particulate solid catalyst and to restrict the downflow of liquid. The ball check valve comprises a ball and a valve seat. The ball is free to move vertically within the riser from the valve seat to a substantially horizontal contact surface. The valve seat has an orifice adapted to be substantially closed by the ball with a diameter smaller than the internal diameter of the riser so that the velocity of the fluid flowing through the orifice is in excess of the transport velocity within the riser so that catalyst particles entering the riser will be carried through the orifice. The ports are located at least one ball diameter above the seat and below the ball contact surface. In one embodiment of the improved bubble cap assembly, the riser contains an orifice mixer.

While particular embodiments of the invention have been described, it is well understood that the invention is not limited thereto since modifications may be made. It is therefore contemplated to cover by the appended claims any such modifications as fall within the spirit and scope of the claims.

What is claimed is:

1. In combination with a high pressure reaction vessel adapted for the reaction of a fluid hydrocarbon feed with a hydrogen rich gas at elevated temperatures and pressures in the presence of a bed of a particulate solid catalyst, said reaction being the type wherein the gas and feed materials are passed upwardly through the bed at velocities whereby the bed is expanded to a volume greater than its static volume and the particulate solid catalyst is put in a state of random motion and wherein the mixture of fluid hydrocarbon, gas and solid constitute a turbulent zone wherein minimum solid settling takes place, and wherein said reaction vessel has a transversely extending partition having a plurality of substantially regularly and uniformly disposed perforations extending through the partition;

a bubble cap assembly including risers being mounted in said perforations and including caps surmounting said risers, said risers having fluid flow ports above said partition, said bubble cap assembly having a ball check valve in the riser to prevent downflow of said particulate solid catalyst, and restricting the downflow of fluid, said ball check valve including a ball and a valve seat, said ball being unrestricted to move vertically within said riser from said valve seat to a ball contact surface of said cap, said valve seat having an orifice adapted to be substantially closed by the ball, said orifice having a smaller internal diameter that that of the riser such that the velocity of the liquid flowing through said orifice is in excess of the transport velocity within said riser whereby catalyst particles entering said riser will be carried through said orifice, wherein the improvement comprises:

the lower limit of said ports positioned at least one ball diameter above said valve seat and the upper limit of said ports positioned at least one ball diameter below said cap contact surface.

2. In combination with a high pressure reaction vessel adapted for the reaction of a fluid hydorcarbon feed with a hydrogen rich gas at elevated temperatures and pressures in the presence of a bed of a particulate solid catalyst, said reaction being the type wherein the gas and feed materials are passed upwardly through the bed at velocities whereby the bed is expanded to a volume greater than its static volume and the particulate solid catalyst is put in a state of random motion and wherein the mixture of fluid hydrocarbon, gas and solid constitute a turbulent zone wherein minimum solid settling takes place, and wherein said reaction vessel has a transversely extending partition having a plurality of substantially regularly and uniformly disposed perforations extending through the partition;

a bubble cap assembly including risers being mounted in said perforations and including caps surmounting said risers, said risers having fluid flow ports above said partition, said bubble cap assembly having a ball check valve in the riser to prevent downflow of said particulate solid catalyst, and restricting the downflow of fluid, said ball check valve including a ball and a valve seat, said ball being unrestricted to move vertically within said riser from said valve seat to a ball contact surface of said cap, said valve seat having an orifice adapted to be substantially closed by the ball, said orifice having a smaller internal diameter than that of the riser such that the velocity of the liquid flowing through said orifice is in excess of the transport velocity within said riser whereby catalyst particles entering said riser will be carried through said orifice, wherein the improvement comprises:

the lower limit of said ports positioned at least one ball diameter above said valve seat and the upper limit of said ports positioned at least one ball diameter below said cap contact surface and wherein the riser contains an orifice mixer upstream of said valve seat orifice.

3. In combination with a high pressure reaction vessel adapted for the reaction of a fluid hydrocarbon feed with hydrogen rich gas at elevated temperatures and pressures in the presence of a bed of a particulate solid catalyst, said reaction being the type wherein the gas and feed materials are passed upwardly through the bed at velocities whereby the bed is expanded to a volume greater than its static volume and the particulate solid catalyst is put in a state of random motion and wherein the mixture of fluid hydrocarbon, gas and solid constitute a turbulent zone wherein minimum solid settling takes place, the lower portion of which is defined by a transversely extending partition having a plurality of substantially regularly and uniformly disposed perforations extending through the partition;

a bubble cap assembly including risers being mounted in said perforations and including caps surmounting said risers, said risers having fluid flow ports above said partition, said bubble cap assembly having a ball check valve in the riser to prevent downflow of said particulate solid catalyst, and restricting the downflow of fluid, said ball check valve including a ball and a valve seat, said valve seat having an orifice adapted to be substantially closed by the ball, said orifice having a smaller internal diameter than that of the riser such that the velocity of the liquid flowing through said orifice is in excess of the transport velocity within said riser whereby catalyst particles entering said riser will be carried through said orifice, wherein the improvement comprises:

said riser containing an orifice mixer upstream of said valve seat orifice.

* * * * *